(12) United States Patent
Lee et al.

(10) Patent No.: US 12,337,615 B2
(45) Date of Patent: Jun. 24, 2025

(54) AXLE SHAFT DISCONNECT CLUTCH

(71) Applicant: Schaeffler Technologies AG & Co. KG, Herzogenaurach (DE)

(72) Inventors: Brian Lee, Charlotte, NC (US); Michael Hodge, Creston, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 421 days.

(21) Appl. No.: 17/868,850

(22) Filed: Jul. 20, 2022

(65) Prior Publication Data

US 2023/0347691 A1 Nov. 2, 2023

Related U.S. Application Data

(60) Provisional application No. 63/335,391, filed on Apr. 27, 2022.

(51) Int. Cl.
| | |
|---|---|
| *F16D 11/14* | (2006.01) |
| *B60B 35/14* | (2006.01) |
| *B60B 35/18* | (2006.01) |
| *B60K 1/00* | (2006.01) |
| *F16D 23/12* | (2006.01) |

(52) U.S. Cl.
CPC .............. *B60B 35/14* (2013.01); *B60B 35/18* (2013.01); *F16D 11/14* (2013.01); *B60B 2380/12* (2013.01); *B60K 2001/001* (2013.01); *F16D 2023/123* (2013.01)

(58) Field of Classification Search
CPC ............... F16D 2023/123; F16D 11/14; F16D 2011/004; F16D 25/22; F16D 25/2204
See application file for complete search history.

(56) References Cited

U.S. PATENT DOCUMENTS

| | | | |
|---|---|---|---|
| 9,783,050 B2 * | 10/2017 | Brooks | ..................... F16H 1/04 |
| 10,323,693 B2 | 6/2019 | Beesley et al. | |
| 2005/0040002 A1 * | 2/2005 | Teraoka | ................. F16D 23/06 |
| | | | 192/53.34 |
| 2018/0345795 A1 * | 12/2018 | Luke | ........................ B60L 7/18 |

FOREIGN PATENT DOCUMENTS

DE 102022125472 A1 * 4/2024

* cited by examiner

*Primary Examiner* — Stacey A Fluhart

(57) ABSTRACT

An axle shaft disconnect clutch includes a housing, an axle shaft, a stub shaft, a dog clutch and an inner race. The axle shaft includes a first outer spline and the stub shaft includes a second outer spline. The dog clutch has an inner spline engaged with the second outer spline and the inner race is rotationally fixed and axially displaceable relative to the housing to axially displace the dog clutch and engage or disengage the inner spline with the first outer spline. In some example embodiments, the axle shaft disconnect clutch has a bushing pad fixed to the inner race. The inner race is arranged to push the dog clutch towards the first outer spline to engage the dog clutch, and the inner race is arranged to pull the bushing pad to pull the dog clutch away from the first outer spline to disengage the dog clutch.

15 Claims, 3 Drawing Sheets

AXLE SHAFT DISCONNECT CLUTCH

CROSS-REFERENCE TO RELATED APPLICATIONS

This application claims the benefit of U.S. Provisional Patent Application No. 63/335,391, filed Apr. 27, 2022, the disclosure of which is incorporated in its entirety by reference herein.

TECHNICAL FIELD

The present disclosure relates generally to a disconnect clutch, and more specifically to an axle shaft disconnect clutch.

BACKGROUND

Axle shaft disconnect clutches are known. One example is shown and described in U.S. Pat. No. 10,323,693 titled DISCONNECT SYSTEM FOR AN AXLE to Beesley et al.

SUMMARY

An axle shaft disconnect clutch includes a housing, an axle shaft, a stub shaft, a dog clutch and an inner race. The housing is for mounting the axle shaft disconnect clutch to a vehicle. The axle shaft includes a first outer spline and the stub shaft is coaxial with the axle shaft and includes a second outer spline. The dog clutch has an inner spline engaged with the second outer spline and the inner race is rotationally fixed and axially displaceable relative to the housing to axially displace the dog clutch and engage or disengage the inner spline with the first outer spline. In some example embodiments, the axle shaft disconnect clutch has a bushing pad fixed to the inner race. The inner race is arranged to push the dog clutch towards the first outer spline to engage the dog clutch, and the inner race is arranged to pull the bushing pad to pull the dog clutch away from the first outer spline to disengage the dog clutch.

In some example embodiments, the dog clutch has a radially extending protrusion, the inner race has a first arcuate protrusion arranged radially outside of the radially extending protrusion, and the bushing pad is disposed radially inside of the first arcuate protrusion and arranged to contact the radially extending protrusion to pull the dog clutch away from the first outer spline. In an example embodiment, the bushing pad is fixed to the first arcuate protrusion with radially extending tabs. In an example embodiment, the bushing pad includes a second arcuate protrusion disposed radially between the radially extending protrusion and the first arcuate protrusion.

In an example embodiment, the axle shaft disconnect clutch includes a stub shaft seal. The housing includes a cover and the stub shaft seal is installed in the cover to seal the housing to the stub shaft. In an example embodiment, the axle shaft disconnect has a first bearing. The housing includes a cover and the first bearing is arranged to support the stub shaft on the cover. In an example embodiment, the axle shaft disconnect clutch has a second bearing arranged to radially align the axle shaft and the stub shaft. In an example embodiment, the axle shaft disconnect clutch has a third bearing arranged to support the axle shaft in the housing.

In some example embodiments, the axle shaft disconnect clutch has a resilient element. The resilient element is arranged to be compressed if the inner race moves towards the dog clutch and the inner spline is not rotationally aligned with the first outer spline. In an example embodiment, the axle shaft disconnect clutch has a washer contacting the dog clutch. The resilient element is a wave spring and the wave spring and the washer are disposed axially between respective annular faces of the inner race and the dog clutch.

In some example embodiments, the axle shaft disconnect clutch has an axially fixed outer race and a rolling element. The inner race and the outer race include respective ramp surfaces, the rolling element is disposed radially between the inner race and the outer race in the respective ramp surfaces, and rotation of the outer race relative to the inner race axially displaces the inner race as the rolling element travels along the respective ramp surfaces. In an example embodiment, the axle shaft disconnect clutch has a ball cage. The rolling element includes a plurality of balls and each one of the plurality of balls is disposed in a respective opening of the ball cage.

In some example embodiments, the housing includes a cover, the inner race is rotationally fixed on the cover, the housing has a first annular wall and the cover has a second annular wall, and the first annular wall and the second annular wall restrict axial displacement of the outer race. In an example embodiment, the cover has a first cylindrical protrusion with axially extending grooves and the inner race has a second cylindrical protrusion with axially extending protrusions disposed in the axially extending grooves to prevent rotation of the inner race relative to the cover.

In some example embodiments, the axle shaft disconnect clutch includes an actuator assembly arranged to rotate the outer race. The outer race has an outer gear and the actuator assembly has an electric motor and a first gear engaged with the outer gear. In an example embodiment, the electric motor has a motor shaft and the actuator assembly has a second gear fixed to the motor shaft and engaged with the first gear.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
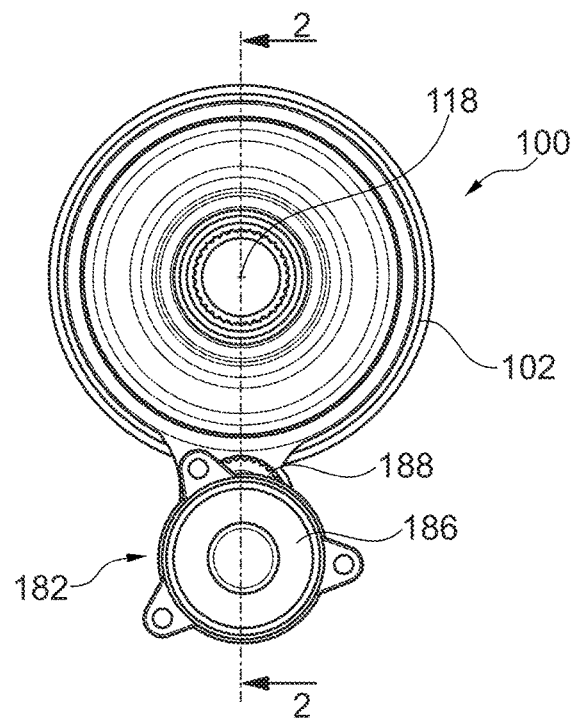
FIG. 1 illustrates an end view of an axle shaft disconnect clutch according to an example embodiment.
Figure 2:
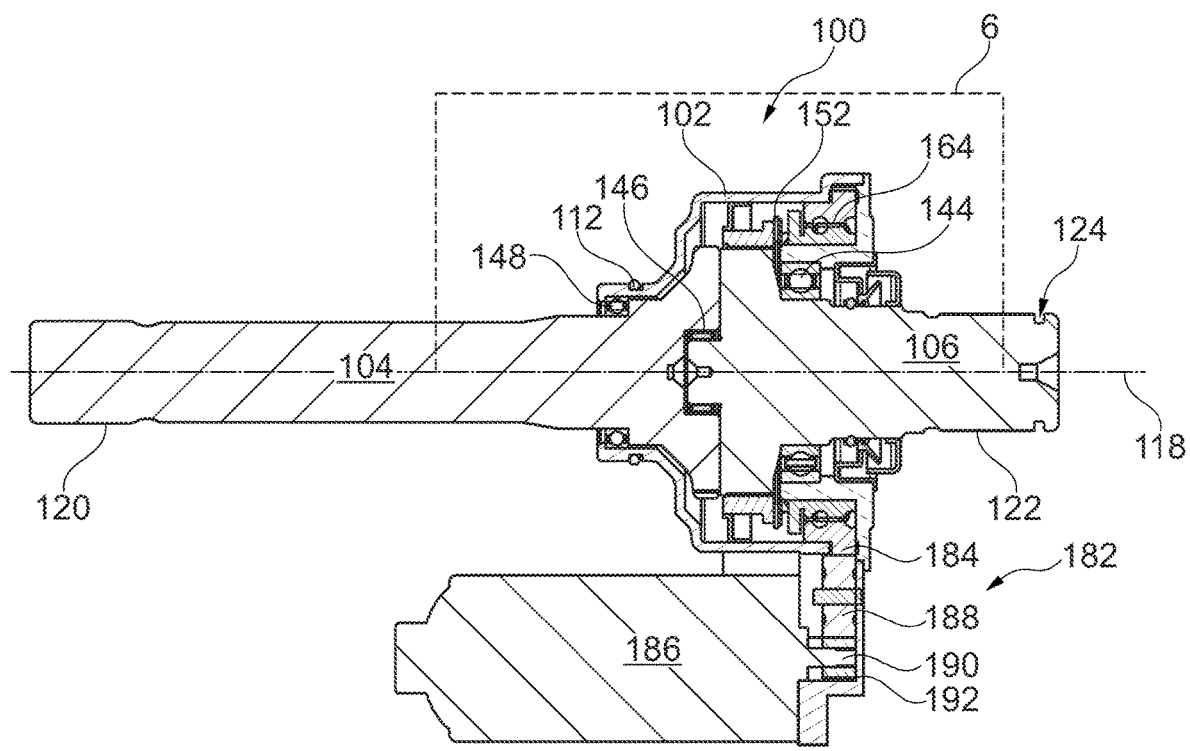
FIG. 2 illustrates a cross-sectional view of the axle shaft disconnect clutch of FIG. 1 depicted in a disengaged condition taken generally along line 2-2 in FIG. 1.
Figure 3:
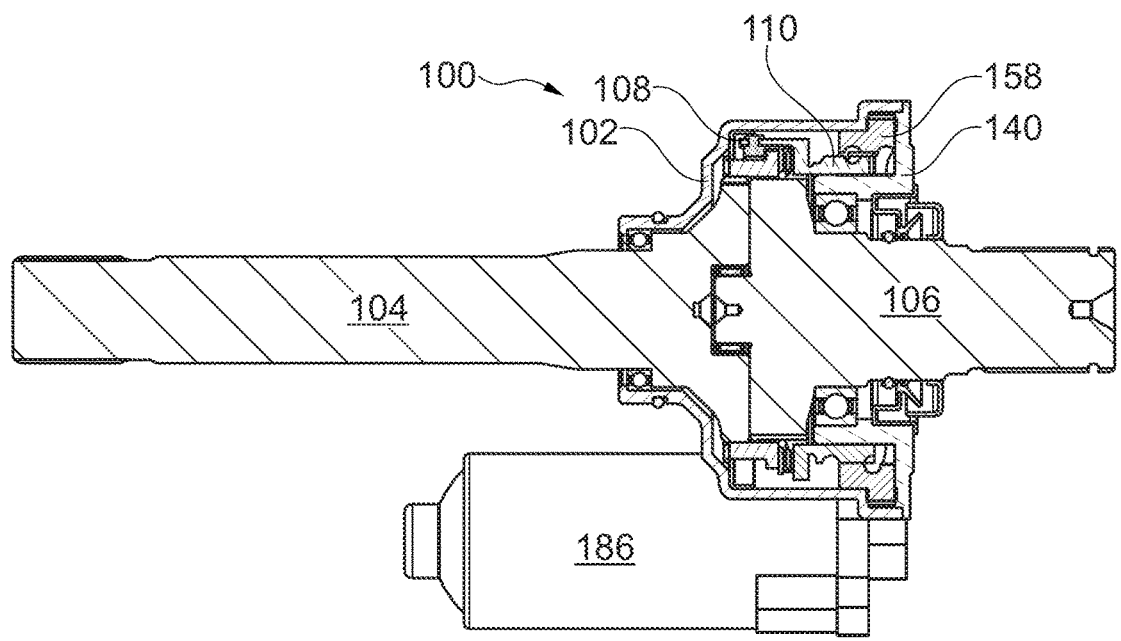
FIG. 3 illustrates a cross-sectional view of the axle shaft disconnect clutch of FIG. 1 depicted in an engaged condition.
Figures 4, 5:
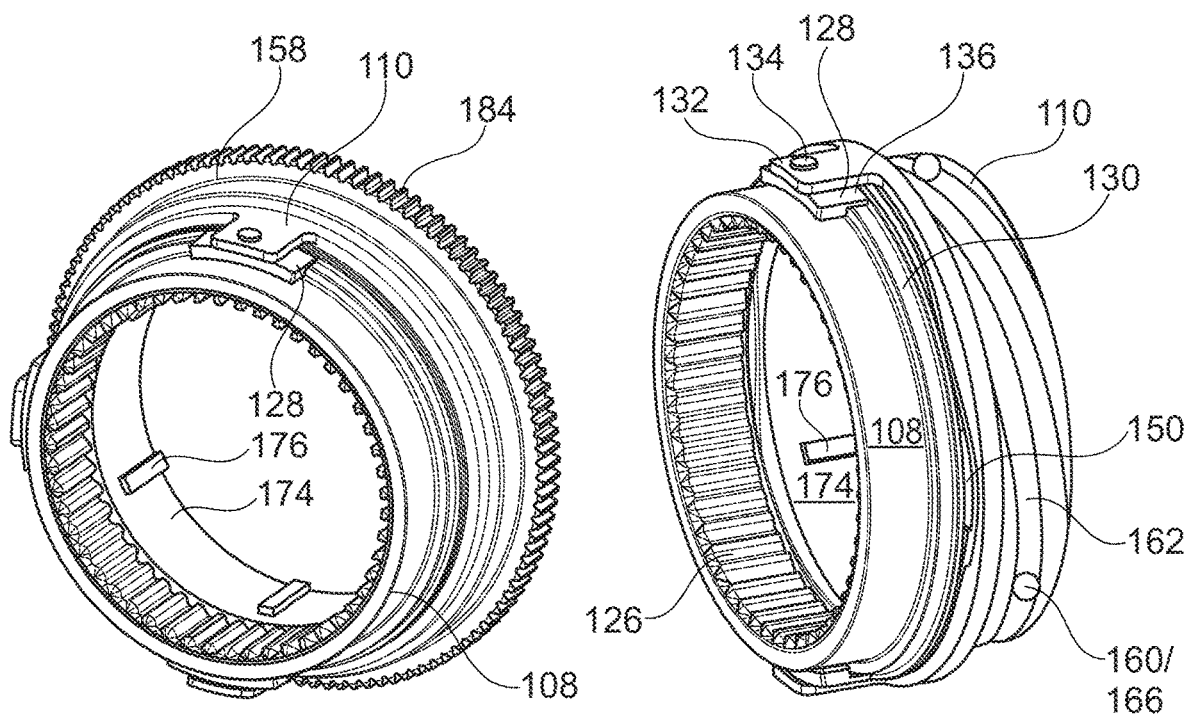
FIG. 4 illustrates a perspective view of a portion of the axle shaft disconnect clutch of FIG. 1.
FIG. 5 illustrates a perspective view of a portion of the axle shaft disconnect clutch of FIG. 1.
Figure 6:
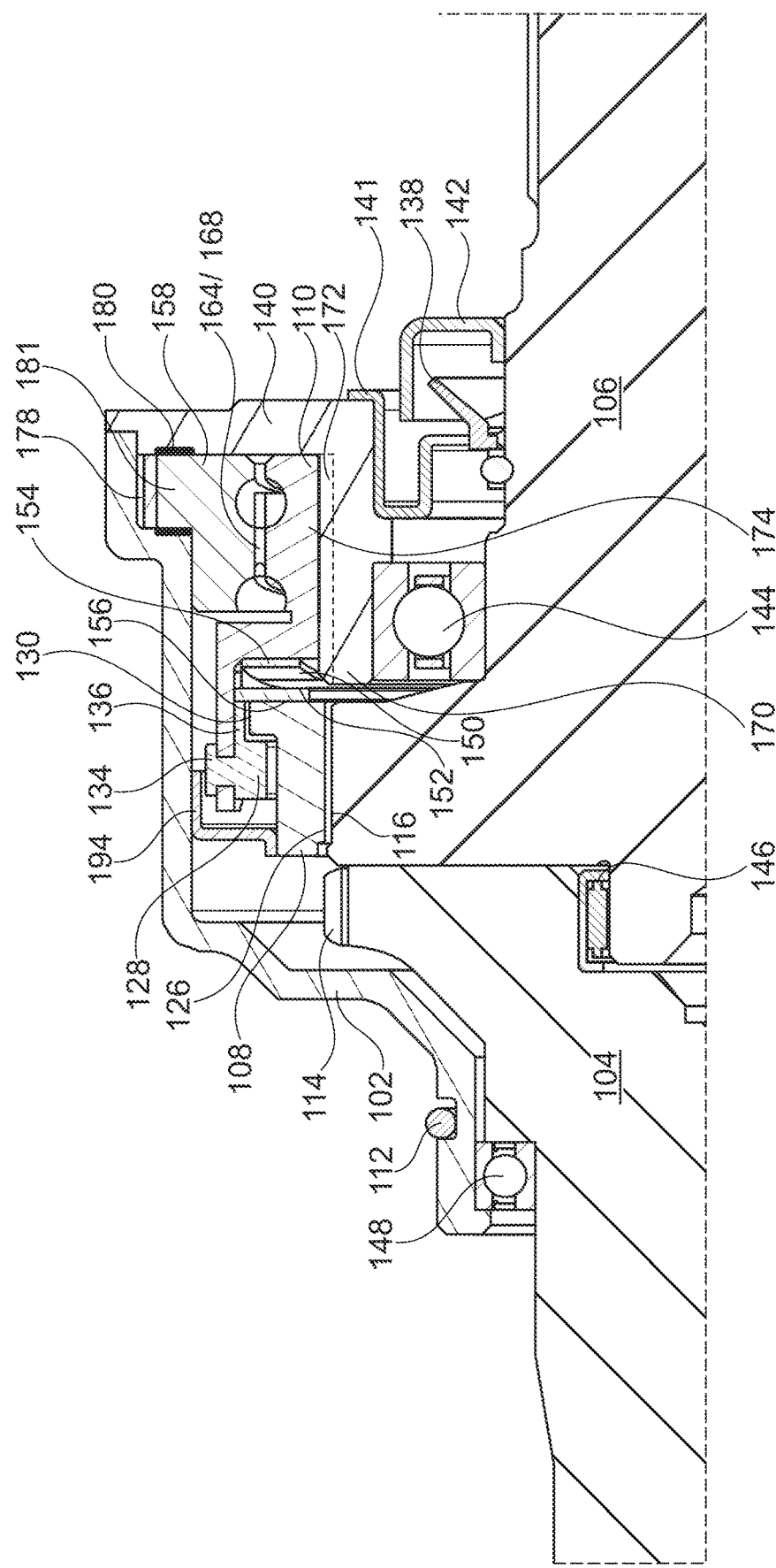
FIG. 6 illustrates a detail view of encircled region 5 in FIG. 2.

The following description is made with reference to FIGS. 1-5. FIG. 1 illustrates an end view of axle shaft disconnect clutch 100 according to an example embodiment. FIG. 2 illustrates a cross-sectional view of the axle shaft disconnect clutch of FIG. 1 depicted in a disengaged condition taken generally along line 2-2 in FIG. 1. FIG. 3 illustrates a cross-sectional view of the axle shaft disconnect clutch of FIG. 1 depicted in an engaged condition. FIG. 4 illustrates a perspective view of a portion of the axle shaft disconnect clutch of FIG. 1. FIG. 5 illustrates a perspective view of a portion of the axle shaft disconnect clutch of FIG. 1. FIG. 6 illustrates a detail view of encircled region 6 in FIG. 2.

An axle shaft disconnect clutch 100 includes housing 102, axle shaft 104, stub shaft 106, dog clutch 108 and inner race 110. Housing 102 is for mounting the axle shaft disconnect clutch to a vehicle (not shown). Housing 102 may include seal 112 for sealing the housing to a differential assembly (not shown) of the vehicle. The housing may be bolted to the differential assembly with bolts (not shown) extending through bosses or ears (not shown) of the housing, for example.

Axle shaft 104 includes outer spline 114 and stub shaft 106 includes outer spline 116. As shown in FIG. 2, for example, the stub shaft is coaxial with the axle shaft. That is, central axis 118 extends through both axle shaft 104 and stub shaft 106. The axle shaft includes drive spline 120 for engaging a differential gear (not shown) in the differential assembly, for example, and the stub shaft includes drive spline 122 for engaging a wheel hub (not shown) of the vehicle, for example. The stub shaft may include groove 124 for receiving a snap ring (not shown) to secure the wheel hub to the stub shaft, for example. Dog clutch 108 includes inner spline 126 engaged with outer spline 116. Inner race 110 is rotationally fixed and axially displaceable relative to housing 102 to axially displace the dog clutch and engage or disengage inner spline 126 with outer spline 114 as described in more detail below.

Axle shaft disconnect clutch 100 also includes bushing pad 128 fixed to inner race 110. The inner race is arranged to push the dog clutch towards outer spline 114 to engage the dog clutch (as shown in FIG. 3, for example) and pull the bushing pad to pull the dog clutch away from outer spline 114 to disengage the dog clutch. Dog clutch 108 includes radially extending protrusion 130 and inner race 110 includes arcuate protrusion 132 arranged radially outside of the radially extending protrusion. Bushing pad 128 is disposed radially inside of arcuate protrusion 132 and arranged to contact the radially extending protrusion to pull the dog clutch away from the first outer spline. Bushing pad 128 is fixed to the arcuate protrusion 132 with radially extending tabs 134. Tabs 134 may be integrally formed from a same piece of material as the bushing pad or may be separate rivets installed in countersunk holes in the bushing pad, for example. Bushing pad 128 includes arcuate protrusion 136 disposed radially between the radially extending protrusion and arcuate protrusion 132. Bushing pad 128 may be made of steel or plastic, for example. Bushing pad 128 may form a complete ring or may be one of a plurality of circumferentially distributed pads as shown in FIGS. 4 and 5.

Axle shaft disconnect clutch 100 includes stub shaft seal 138 and housing 102 includes cover 140. The stub shaft seal is installed in the cover to seal the housing to the stub shaft. Seal 138 may be a lip seal, for example, with metal case 141 pressed into a bore of the cover. Metallic shield 142 may be pressed onto the stub shaft to help protect seal 138 from road debris, for example. Axle shaft disconnect clutch also includes bearings 144, 146 and 148. Bearing 144 is arranged to support the stub shaft on the cover, bearing 146 is arranged to radially align the axle shaft and the stub shaft, and bearing 148 is arranged to support the axle shaft in the housing. Bearings 144 and 148 are depicted as ball bearings and bearing 146 is depicted as a needle bearing, but other configurations are possible. For example, one or both of bearings 144 and 148 may be a tapered roller bearing and bearing 146 may be a plain bearing in some applications. In other words, any combination of ball bearings, roller bearings and/or plain bearings that satisfies the load requirements may be employed.

Axle shaft disconnect clutch 100 also includes resilient element 150 arranged to be compressed if the inner race moves towards the dog clutch and the inner spline is not rotationally aligned with outer spline 114. In other words, if outer splines 114 and 116 are not rotationally aligned (e.g., a "block shift"), dog clutch 108 would be prevented from engaging outer spline 114 because the teeth of the inner spline of the dog clutch and outer spline 114 of the axle shaft would contact, preventing displacement of the dog clutch. Resilient element 150 may be a wave spring, for example. So, in case of a block shift, instead of moving the dog clutch, the inner race compresses the wave spring so that, once the splines rotationally align, the force from the compressed spring moves the dog clutch to engage outer spline 114. This allows for ratcheting or skipping of the clutch teeth in the event of a shift commanded at a speed too high for engagement, for example, and prevents damage to the actuator assembly discussed below. Although a wave spring is depicted, the resilient element may be a belleville spring, circumferentially distributed coil springs in a retainer, or a rubber element for example. The axle shaft disconnect clutch shown in the figures also includes washer 152 contacting the dog clutch and the wave spring and the washer are disposed axially between respective annular faces 154 and 156 of the inner race and the dog clutch.

Axle shaft disconnect clutch 100 also includes axially fixed outer race 158 and rolling element 160. The inner race and the outer race include respective ramp surfaces (e.g., ramp surface 162 on inner race 110 in FIG. 5) and the rolling element is disposed radially between the inner race and the outer race in the respective ramp surfaces. Rotation of the outer race relative to the inner race axially displaces the inner race as the rolling element travels along the respective ramp surfaces. The axle shaft disconnect clutch also includes ball cage 164 and the rolling element includes a plurality of balls 166 disposed in respective openings 168 of the ball cage. The ball cage keeps the balls circumferentially positioned relative to one another. Although balls are shown, other rolling element (e.g., a cylindrical roller in a roller cage) may be employed.

The cover includes cylindrical protrusion 170 with axially extending grooves 172 and the inner race includes cylindrical protrusion 174 with axially extending protrusions 176 disposed in the axially extending grooves to prevent rotation of the inner race relative to the cover. Although grooves are shown in the cover and protrusions in the inner race, other embodiments may include grooves in the inner race and protrusions in the cover. Housing 102 includes annular wall 178 and cover 140 includes annular wall 180 that restricts axial displacement of the outer race. That is, the outer race has radially extending protrusion 181 disposed axially between annular walls 178 and 180 that keeps the outer race axially positioned but still allows it to rotate. So, as described above, rotation of the outer race relative to the inner race axially displaces the inner race as the rolling element travels along the respective ramp surfaces because the outer race is axially fixed in the housing and the inner race is rotationally fixed on the cover but can be axially displaced. As the outer race rotates in a first rotational direction, the inner race is pushed away from the outer race and, as the outer race rotates in a second rotational direction, opposite the first rotational direction, the inner race is pulled back towards the outer race. As discussed above, element 150 can compress so that, even if the dog clutch cannot be displaced due to tooth misalignment, the inner race can still displace away from the outer race. And, when the inner race moves towards the outer race, the bushing pad pulls the dog clutch to disengage outer spline 114.

Axle shaft disconnect clutch 100 also includes actuator assembly 182 arranged to rotate the outer race. Actuator assembly 182 may be an electromechanical actuation system, for example. The outer race includes outer gear 184 and the actuator assembly includes electric motor 186 and gear 188 engaged with the outer gear (ref. FIG. 2). Electric motor 186 includes motor shaft 190 and the actuator assembly includes gear 192 fixed to the motor shaft and engaged with the gear 188. Although the actuator assembly is depicted with two gears, more or less gears may be employed to vary a torque multiplication depending on a torque requirement for engaging the dog clutch and a torque output of the motor. Furthermore, the motor may be a vacuum motor or a hydraulic motor, for example. As shown, axle shaft disconnect clutch 100 includes target 194 fixed to the dog clutch for reading by an axial position sensor (not shown). Target 194 may be nonferrous (e.g., aluminum or stainless steel) and used to determine whether the dog clutch is engaged or disengaged with outer spline 114. The target may be pressed onto the dog clutch, or fixed by welding, adhesives, or staking, for example.

The axle shaft disconnect clutch allows the stub shaft to be disconnected from the axle shaft for improved efficiency in a vehicle, for example. When used with a differential, disengaging the axle shaft from the stub shaft allows free rotation of the axle shaft so that other components rotationally fixed to the differential [e.g., an electric motor or an axle shaft for an all-wheel drive (AWD) vehicle] to remain stationary. In other words, due to the gear layout of the differential, an opposite-side axle shaft spins in a first rotational direction and axle shaft 104 spins in a second rotational direction, opposite the first rotational direction, so that a housing for the differential and the other component need not rotate, reducing friction and drag on a vehicle driveline. Once torque output is commanded, the dog clutch is engaged with outer spline 114 and torque output from the other component (motor or axle shaft) is transmitted to both axle shafts through the differential gears so that the opposite-side axle shaft and axle shaft 104 spin in a same rotational direction through the stub shafts to the wheels.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Axle shaft disconnect clutch
102 Housing
104 Axle shaft
106 Stub shaft
108 Dog clutch
110 Inner race
112 Seal
114 Outer spline (first)
116 Outer spline (second)
118 Central axis
120 Drive spline (first)
122 Drive spline (second)
124 Groove
126 Inner spline
128 Bushing pad
130 Radially extending protrusion
132 Arcuate protrusion (first)
134 Radially extending tabs
136 Arcuate protrusion (second)
138 Stub shaft seal
140 Cover (housing)
141 Metal case
142 Metallic shield
144 Bearing (first)
146 Bearing (second)
148 Bearing (third)
150 Resilient element
152 Washer
154 Annular face (inner race)
156 Annular face (dog clutch)
158 Outer race
160 Rolling element
162 Ramp surface (inner race)

164 Ball cage
166 Ball
168 Openings (ball cage)
170 Cylindrical protrusion (first, cover)
172 Axially extending grooves
174 Cylindrical protrusion (second, inner race)
176 Axially extending protrusions
178 Annular wall (first, housing)
180 Annular wall (second, cover)
181 Radially extending protrusion
182 Actuator assembly
184 Outer gear (outer race)
186 Electric motor
188 Gear (first)
190 Motor shaft
192 Gear (second)
194 Target

What is claimed is:

1. An axle shaft disconnect clutch, comprising:
a housing for mounting the axle shaft disconnect clutch to a vehicle;
an axle shaft, the axle shaft comprising a first outer spline;
a stub shaft, coaxial with the axle shaft, the stub shaft comprising a second outer spline;
a dog clutch comprising an inner spline engaged with the second outer spline and a radially extending protrusion;
an inner race, rotationally fixed and axially displaceable relative to the housing to axially displace the dog clutch and engage or disengage the inner spline with the first outer spline; and
a bushing pad fixed to the inner race, wherein:
the inner race is arranged to push the dog clutch towards the first outer spline to engage the dog clutch;
the inner race is arranged to pull the bushing pad to pull the dog clutch away from the first outer spline to disengage the dog clutch;
the inner race comprises a first arcuate protrusion arranged radially outside of the radially extending protrusion; and
the bushing pad is disposed radially inside of the first arcuate protrusion and arranged to contact the radially extending protrusion to pull the dog clutch away from the first outer spline.

2. The axle shaft disconnect clutch of claim 1 wherein the bushing pad is fixed to the first arcuate protrusion with radially extending tabs.

3. The axle shaft disconnect clutch of claim 1 wherein the bushing pad includes a second arcuate protrusion disposed radially between the radially extending protrusion and the first arcuate protrusion.

4. The axle shaft disconnect clutch of claim 1 further comprising a stub shaft seal, wherein:
the housing comprises a cover; and
the stub shaft seal is installed in the cover to seal the housing to the stub shaft.

5. The axle shaft disconnect clutch of claim 1 further comprising a first bearing, wherein:
the housing comprises a cover; and
the first bearing is arranged to support the stub shaft on the cover.

6. The axle shaft disconnect clutch of claim 1 further comprising a second bearing arranged to radially align the axle shaft and the stub shaft.

7. The axle shaft disconnect clutch of claim 1 further comprising a third bearing arranged to support the axle shaft in the housing.

8. The axle shaft disconnect clutch of claim 1 further comprising a resilient element, wherein the resilient element is arranged to be compressed if the inner race moves towards the dog clutch and the inner spline is not rotationally aligned with the first outer spline.

9. An axle shaft disconnect clutch, comprising:
a housing for mounting the axle shaft disconnect clutch to a vehicle;
an axle shaft, the axle shaft comprising a first outer spline;
a stub shaft, coaxial with the axle shaft, the stub shaft comprising a second outer spline;
a dog clutch comprising an inner spline engaged with the second outer spline;
an inner race, rotationally fixed and axially displaceable relative to the housing to axially displace the dog clutch and engage or disengage the inner spline with the first outer spline;
a resilient element; and
a washer contacting the dog clutch, wherein:
the resilient element is arranged to be compressed if the inner race moves towards the dog clutch and the inner spline is not rotationally aligned with the first outer spline;
the resilient element is a wave spring; and
the wave spring and the washer are disposed axially between respective annular faces of the inner race and the dog clutch.

10. An axle shaft disconnect clutch, comprising:
a housing for mounting the axle shaft disconnect clutch to a vehicle;
an axle shaft, the axle shaft comprising a first outer spline;
a stub shaft, coaxial with the axle shaft, the stub shaft comprising a second outer spline;
a dog clutch comprising an inner spline engaged with the second outer spline;
an inner race, rotationally fixed and axially displaceable relative to the housing to axially displace the dog clutch and engage or disengage the inner spline with the first outer spline;
an axially fixed outer race; and
a rolling element, wherein:
the inner race and the outer race comprise respective ramp surfaces;
the rolling element is disposed radially between the inner race and the outer race in the respective ramp surfaces; and
rotation of the outer race relative to the inner race axially displaces the inner race as the rolling element travels along the respective ramp surfaces.

11. The axle shaft disconnect clutch of claim 10 further comprising a ball cage, wherein:
the rolling element comprises a plurality of balls; and
each one of the plurality of balls is disposed in a respective opening of the ball cage.

12. The axle shaft disconnect clutch of claim 10 wherein:
the housing comprises a cover;
the inner race is rotationally fixed on the cover;
the housing comprises a first annular wall and the cover comprises a second annular wall; and
the first annular wall and the second annular wall restrict axial displacement of the outer race.

13. The axle shaft disconnect clutch of claim 12 wherein:
the cover comprises a first cylindrical protrusion with axially extending grooves; and
the inner race comprises a second cylindrical protrusion with axially extending protrusions disposed in the axially extending grooves to prevent rotation of the inner race relative to the cover.

14. The axle shaft disconnect clutch of claim 10 further comprising an actuator assembly arranged to rotate the outer race, wherein:
   the outer race comprises an outer gear; and
   the actuator assembly comprises:
      an electric motor; and
      a first gear engaged with the outer gear.

15. The axle shaft disconnect clutch of claim 14 wherein:
   the electric motor comprises a motor shaft; and
   the actuator assembly comprises a second gear fixed to the motor shaft and engaged with the first gear.

* * * * *